United States Patent
He et al.

(10) Patent No.: US 7,123,601 B2
(45) Date of Patent: Oct. 17, 2006

(54) FAST MOBILE ORIGINATED CALL IN SLOTTED MODE

(75) Inventors: Tao He, San Diego, CA (US); Li Li, San Diego, CA (US)

(73) Assignee: Nokia Corporation, Espoo (FI)

( * ) Notice: Subject to any disclaimer, the term of this patent is extended or adjusted under 35 U.S.C. 154(b) by 478 days.

(21) Appl. No.: 10/375,602

(22) Filed: Feb. 27, 2003

(65) Prior Publication Data

US 2004/0170141 A1    Sep. 2, 2004

(51) Int. Cl.
*H04B 7/216*    (2006.01)
(52) U.S. Cl. .................... 370/335; 370/342
(58) Field of Classification Search ........... 370/441, 370/442, 480, 347, 342, 320, 321, 329, 335, 370/336, 337, 350; 375/131–135
See application file for complete search history.

(56) References Cited

U.S. PATENT DOCUMENTS

| | | | |
|---|---|---|---|
| 5,491,718 A | 2/1996 | Gould et al. | 375/205 |
| 5,513,183 A * | 4/1996 | Kay et al. | 370/337 |
| 5,596,571 A | 1/1997 | Gould et al. | 370/335 |
| 5,887,252 A | 3/1999 | Noneman | 455/414 |
| 6,445,701 B1 | 9/2002 | Bahl | 370/368 |
| 6,480,476 B1 | 11/2002 | Willars | 370/311 |
| 6,505,058 B1 | 1/2003 | Willey | 455/574 |
| 6,618,363 B1 * | 9/2003 | Bahl | 370/329 |
| 6,636,488 B1 | 10/2003 | Varma | 370/278 |

* cited by examiner

*Primary Examiner*—Ajit Patel
(74) *Attorney, Agent, or Firm*—Harrington & Smith, LLP

(57) ABSTRACT

A method of requesting access from a mobile station (MS) 10 to a network 8 by which to conduct user-to-user communications (e.g., requesting a dedicated traffic channel) is presented. A first time is when a user input at the mobile station 10 initiates a call. The first time as compared to a threshold time. A time-dependent code, such as a CDMA long code, is calculated for a random time if the first time is earlier than the threshold time, or for the beginning of a slot is the first time is later than the threshold time. A mobile station 10 to practice the method includes a user interface 26 whereby a call may be initiated at the first time, a processor 22 for calculating the time-dependent code, and a comparator for comparing a start threshold time to the first time. The threshold time is related to the slot time.

18 Claims, 5 Drawing Sheets

FAST MOBILE ORIGINATED CALL IN SLOTTED MODE

TECHNICAL FIELD

These teachings relate generally to wireless communications between a wireless network and a mobile station such as a cellular phone. They particularly relate to a mobile station initiating a wireless connection over a CDMA network while in slotted, or discontinuous reception, mode.

BACKGROUND

Due to the limited radio spectrum available for wireless communications, and the need to conserve battery power within mobile stations (MSs), such as cellular phones and terminals, certain networks have implemented a discontinuous reception (DRX) or "slotted mode" protocol. A mobile station in the slotted mode monitors a paging channel of the network at only predetermined times, or slots, within a slot cycle. At all other times in the slot cycle, the mobile station need not monitor the paging channel. This allows the mobile station to operate in a reduced power consumption mode and prolong standby time for a given battery charge.

The network tracks slot times for each mobile station within each geographically based network cell. When a phone call, for example, is routed through the network to a recipient MS, a base station(s) (BS) associated with the appropriate cell(s) transmits a 'page' over the paging channel to the recipient MS. Because both the network and the mobile station know which slot the mobile station will be monitoring, the network sends the 'page' at a time coincident with or overlapping the monitored slot, rather than continuously over the paging channel. The paging channel is typically a uni-directional downlink (BS to MS) channel. The mobile station uses a different channel (typically a uni-directional uplink channel called Access channel) that does not operate on the slot times of the paging channel to request a dedicated traffic channel for the pending phone call.

In CDMA IS95 or IS2000 versions A, B, and C, the slot cycle is divided into 16 slots of 80 milliseconds each, numbered 0–15. The basic slot cycle time is 1.28 seconds (16 slots at 80 milliseconds each). The frequency of slots monitored by the mobile station may vary according to demands on the network at any given time, such that the current slot cycle time $T=1.28 \times 2^i$ seconds, wherein i is an integer 0, 1, 2, etc., known as the slot cycle index. Thus for a slot cycle index i=0, the slot cycle time T is the basic slot cycle, 1.28 seconds, and each mobile station must monitor one slot per each basic cycle. For a slot cycle index i=2 the slot cycle time T is expanded to 5.12 seconds, and each mobile station must monitor only one slot for each 4 basic slot cycles. Typically, the network transmits a maximum slot cycle index that it will support at a particular cell, and each mobile station operates on its maximum slot cycle index consistent with that broadcast maximum (e.g., if a network/cell transmits maximum i=2, an MS that support i≦4 will operate within that network/cell at i=2; if the network/cell transmits maximum i=2, an MS that support i≦1 will operate within that network/cell at i=1).

Mobile stations may employ one of at least two architectures for 'waking up' the MS when originating a call. As used herein, the mobile station is in a 'sleep' mode when it is powered on but at a power consumption rate that maximizes standby time. The MS is in an 'awakened' mode when additional circuitry is powered as compared to the sleep mode (e.g., the MS is monitoring the paging channel). One approach 'wakes' the mobile station every 1.28 seconds regardless of slot cycle index (though wakeups between designated slots for i>0 are of a shorter duration). This approach is referred to herein as the fixed interval system.

An alternate approach is to only 'wake' the mobile station at the designated paging slot that the network requires the mobile station to monitor, hereinafter, a true index system. Because the true index system wakes the mobile station less often and for less total time, it consumes approximately 10% less power than the fixed interval system at a slot cycle index i=2. Power conservation remains an important consideration in most aspects of mobile station design and operation.

The mobile station must monitor the paging channel only during the slots designated by the network, and the network architecture or protocol does not tie call origination from the mobile station to its assigned slot. Nevertheless, some, if not all, mobile station architectures prevent the mobile station from transmitting a call setup or channel access request to the network until the mobile station wakes up according to its slot schedule. The greatest time lag occurs when the user presses the 'talk' or 'send' button immediately after the mobile station goes into sleep mode. For the fixed interval approach, this is a delay of 1.28 seconds regardless of slot time index. However, for the true index approach, there is a 5.12 second delay (minus 80 milliseconds) at index i=2, a wait sufficiently long so has to be noticeable by the user.

SUMMARY OF THE PREFERRED EMBODIMENTS

The foregoing and other problems are overcome, and other advantages are realized, in accordance with the presently preferred embodiments of these teachings. According to one aspect, the present invention provides a method of requesting access from a mobile station to a network by which to conduct user-to-user communications (e.g., requesting a dedicated traffic channel). The method includes receiving a user input at a first time, comparing the first time to a predetermined threshold time, calculating a time-dependent code, and transmitting an access request to the network.

According to another aspect, the present invention also includes a mobile station that may execute the above method. The mobile station includes a user interface through which a user input may be entered a first-time, a processor for calculating a time-dependent code, and circuitry, such as a comparator, for comparing a threshold time to the first-time. The threshold time is related to a slot time.

Another aspect of the present invention is a method for operating a mobile station in a slotted mode, wherein a network connection request from a user is received at a first time, the first time is compared to a predetermined threshold time; and a decision is made whether to delay or to immediately initiate a start of network-connection procedures.

Yet another aspect of the present invention is a method for determining how a mobile station operating within a slot of a slotted mode acquires a time-dependent code. This method includes determining a threshold time $t_{thresh}$ based on a slot cycle index receiving an input at a user interface of the mobile station at a current time $t_{curr}$, comparing the time $t_{curr}$ to the time $t_{thresh}$, and performing pilot acquisition of the time-dependent code if the time $t_{curr}$ is earlier in the slot than the time $t_{thresh}$.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENT

The following description is in the context of a network that employs code division multiplex access (CDMA) technology such as IS95 or IS2000, but the invention is not limited to such a network or to a specific technological standard. Rather, the context is illustrative of the best mode for presently practicing the invention, but such illustration is not limiting to the invention or to the ensuing claims. For clarity, the description is also made in the context of a cellular phone call using servers within a mobile station. Such context is illustrative only and not limiting; the present invention can be used, for example, with data transmissions, packet-switched networks and internet connections, etc. When a user requests a connection with the network through the mobile station (e.g., depresses a TALK button), there is an inherent delay in the mobile station transmitting an access request due to power saving considerations, detailed below.

Figure 1:
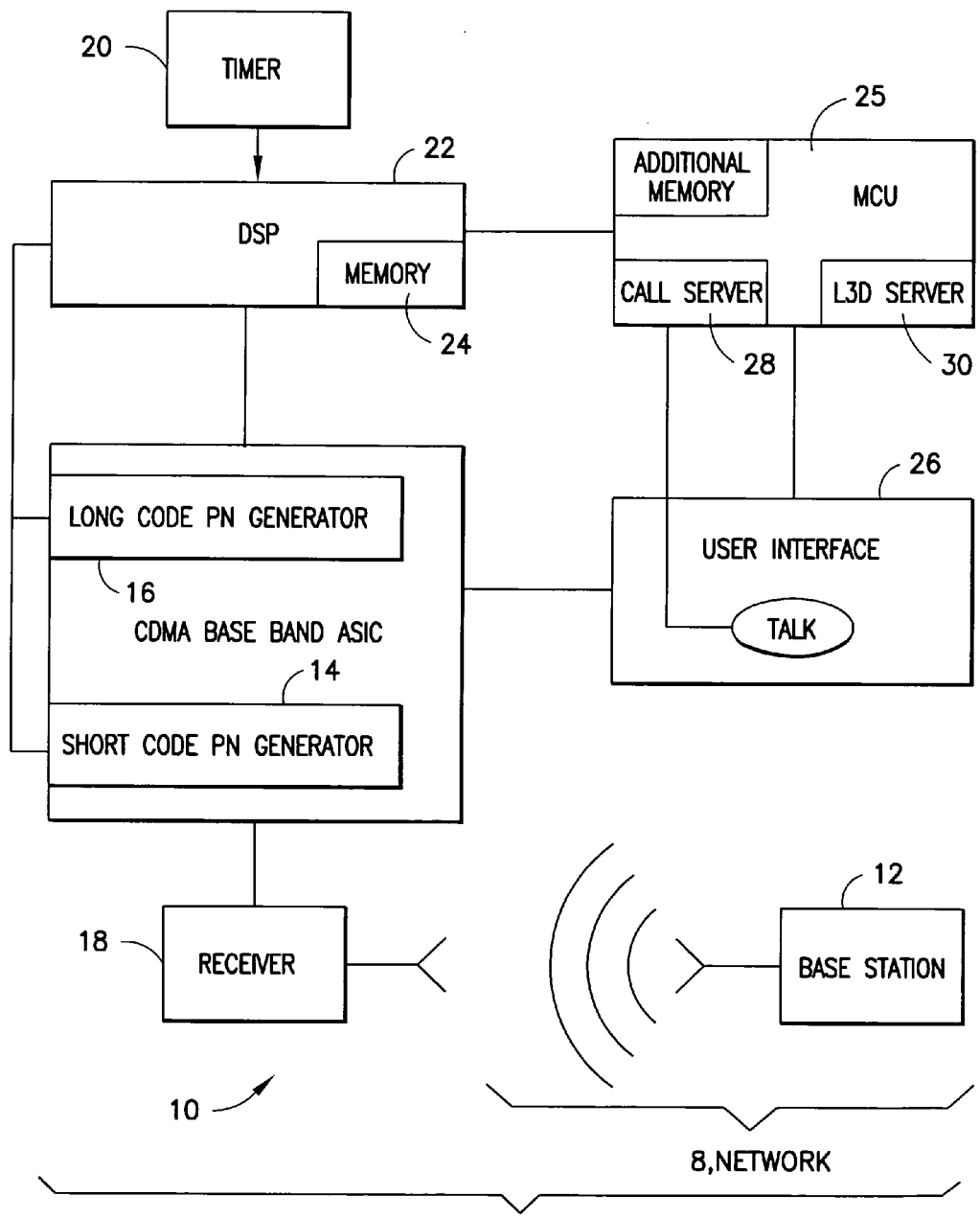
FIG. 1 is a block diagram of a mobile station in accordance with the present invention proximal to a base station.

FIG. 1 depicts a mobile station 10 in block diagram form that is assumed to be proximal to a base station 12 that is part of a CDMA network 8. The mobile station 10, employing CDMA technology, is assumed to include a system time pseudorandom noise (PN) generator 14, also referred to herein as a short code generator 14. The short code generator 14 is used for loading other PN generators for de-spreading a CDMA signal received from the base station 12 at a receiver 18 of the mobile station 10.

Another feature of CDMA technology is the use of a long code PN generator 16 for identification of the mobile station 10 to the network 8. The long code is a PN sequence, defining a period of $2^{42}-1$, that is used for scrambling on the forward (base station to MS) CDMA channel and for spreading on the reverse (MS to base station) channel. The long code uniquely identifies the mobile station 10 on both the forward and the reverse traffic channels. The long code also serves to provide limited privacy, and separates multiple access channels on the same CDMA channel. When operating in the slotted mode, it is preferable to turn off the whole receiver for power conservation during the sleep cycles, including RF circuitry and baseband CDMA logic such as the long code generator 16. Since the long code generator 16 is meant to run continuously, various methods have been devised to store a value prior to shutdown or sleep mode of the mobile station 10, and calculate the proper long code based on that stored value once the mobile station 10 wakes up. See, for example, commonly assigned U.S. Pat. No. 5,491,718, herein incorporated by reference in its entirety.

The mobile station also includes a timer 20 (that is typically less precise than the system time PN generator 14), a processor 22 such as a digital signal processor (DSP), and a user interface 26. Some mobile stations may use an application specific integrated circuit (ASIC) to perform the functions attributed herein to the DSP. Memory 24 may be resident in a micro control unit (MCU) 25, or may be resident with the processor 22, in whole or in part. A Call Application server 28 and a Layer 3 server 30 are software entities and/or circuitry in a particular embodiment of the invention, and typically are embedded in the MCU 25. The Call Application server 28 is within an application layer that lies on top of Layer 3 (see FIG. 2 for context), and may be termed differently by different manufacturers, software providers and the like. The processor 22 in conjunction with the MCU 25 controls the overall operation of the mobile station 10. One function of the timer 20 is to periodically generate an interrupt signal to the processor 22, waking it from a quiescent state to an active state in accordance with the time slots on the paging channel that the network 8 requires the mobile station 10 to monitor. Certain inputs at the user interface 26, such as depressing the TALK button, may also wake the processor 22 from a quiescent state to an active state. When the processor 22 enters a quiescent state (i.e., the mobile station 10 goes into the sleep mode), values corresponding to the long code and the short code are stored in memory 24. When the processor 22 wakes up into an active state due to the timer 20, the processor accesses the stored long and short code values and calculates new codes, based on those stored values and the current time as indicated by the timer 20. Once new codes are calculated, memory 24 is purged of the previously stored code values to make room for a new set of code values to be stored when the mobile station next goes to sleep. The process of calculating a long or short code based on stored prior code values and the current time is herein termed re-acquiring the codes.

Figure 2:
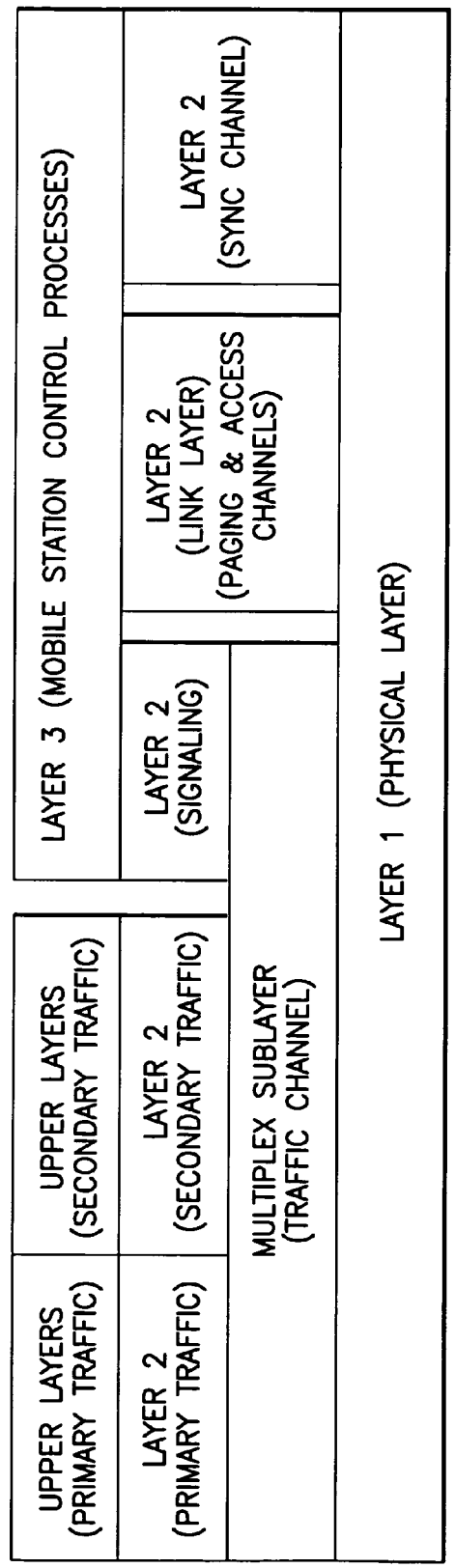
FIG. 2 is a block diagram of the existing hierarchy of layers and channels in a CDMA network.

FIG. 2 depicts a hierarchy of layers and channels in a CDMA network 8 as known in the art. The present invention is directed to layer 3, mobile communication control processes, and specifically how those processes enable communications with layer 1 through the paging and access channels of the link layer 2.

Figure 3A:
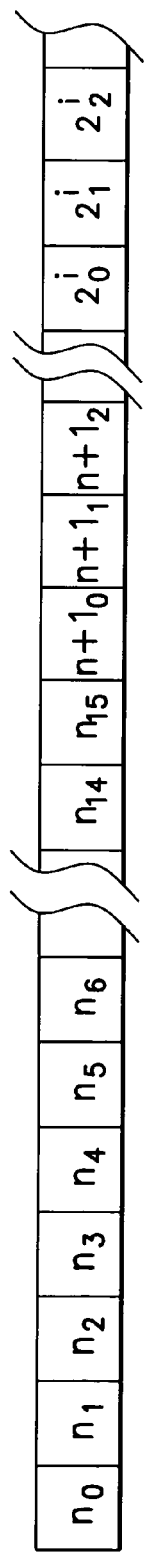
FIG. 3A is a diagram of slot cycles of a paging channel.

FIG. 3A diagrams a slot cycle as previously described, wherein time is represented along the horizontal axis. The slot cycle has a duration $T=1.28 \times 2^i$ seconds, wherein i is the slot cycle index. The slots in a slot cycle are numbered $n_0$, $n_1$, $n_2$, ... $n_{15}$, $n+1_0$, $n+1_1$, $n+1_2$, ... $n+1_{15}$, ... etc., where n varies between 1 and $2^i$. The network 8 may transmit over the paging channel during any of the time slots, and typically transmits to a particular mobile station over the paging channel only at a time corresponding with that mobile station's assigned slot.

A mobile station operating in a slotted mode is required to monitor a paging channel during only one slot for each $2^i$ basic cycles, as assigned by the network 8. For power consumption reasons, it is preferable that a mobile station monitors only those slots required by the network 8. In the example of FIG. 2B, a mobile station operating in the slotted mode monitors only slots designated x, x+1, etc. At i=0, the mobile station monitors the paging channel during one slot every 1.28 seconds; at i=2, the mobile station monitors one slot every 5.12 seconds.

Figure 5:
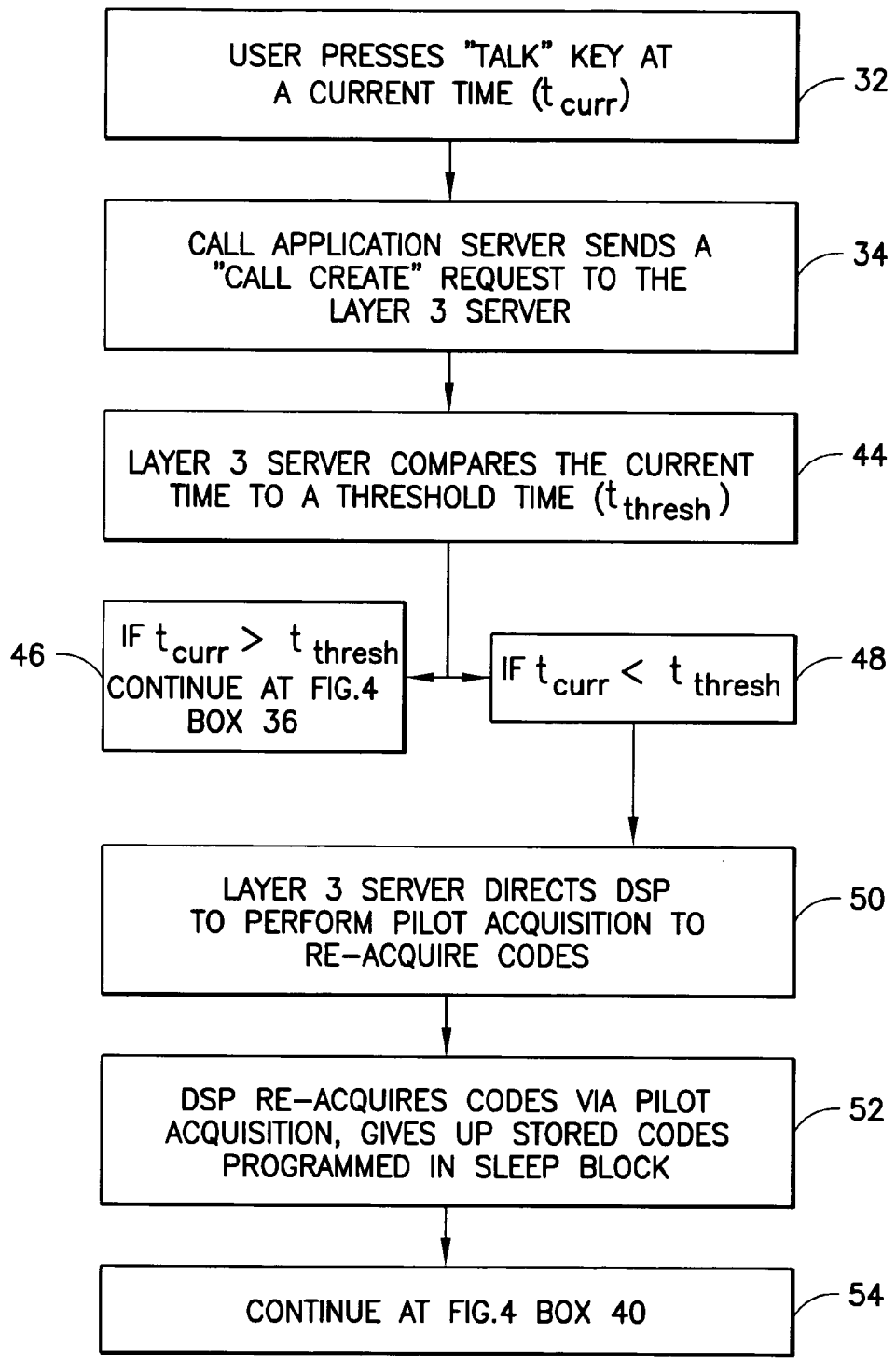
FIG. 5 is a block diagram depicting call access procedures according to the present invention.

Before describing a method of this invention with respect to FIG. 5, a description will first been made of a prior art mobile station 10 connection method. In accordance with the preferred embodiment of the invention, a threshold time $t_{thresh}$ divides the slot cycle index as follows. When a user of the mobile station presses a 'talk' or 'send' key to initiate a call from the mobile station 10 at a time after the threshold time, such as at point A of FIG. 3B, the mobile station 10 transmits an access request to the network 8 via internal routing which ties the time of the access request to the currently assigned slot time. However, when a user of the mobile station 10 presses the talk key to initiate a call from the mobile station 10 at a time prior to the threshold time, such as at point B, the mobile station 10 transmits an access request at a time that is not tied to the currently assigned slot time.

Figure 3B:
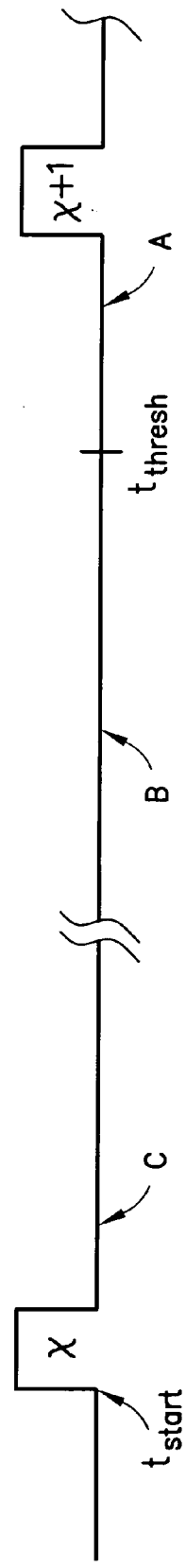
FIG. 3B is a diagram of slots monitored by a mobile station.

FIG. 3B makes clear that when a user presses the talk key immediately after slot x, and if the time that the mobile station 10 transmits an access request is tied to the slot time, a higher slot cycle index results in a longer delay in transmitting the access request. For example, a slot index of 2 yields a cycle time of 5.12 seconds, and a user pressing the talk key at point C of FIG. 3B (immediately after the end of slot x) would wait about 5 seconds before access procedures are initiated, which may then be confirmed by the word "connecting" being displayed at a graphical interface at the mobile station 10. Slot times greater than zero may extend battery life and standby time of a mobile station 10, but further exacerbate the above problem concerning immediacy of service. In accordance with the preferred embodiment of the invention, if the mobile station user presses the talk key, or any other key or user input that causes the mobile station to begin a network connection process at a first time, the mobile station 10 compares that first time against the threshold time. Depending upon the result of that comparison, the user input is routed internally within the mobile station 10 according to one of two possibilities in order to generate an access request that is transmitted to the network 8. The access request is generally over a uni-directional reverse or uplink (MS 10 to BS 12) channel, and requests the network 8 to dedicate a bi-directional traffic channel to the impending voice or data call.

The threshold time as measured from the previously monitored slot may vary according to the slot cycle index, but ideally is a fixed time interval prior to the start of the next succeeding slot to be monitored. For example, the elapsed time between the end of one slot x and the start of the next subsequent slot x+1 may be represented by $\Delta T_{sleep} = (1.28 \times 2^i) - 0.08$ seconds (since the monitored slot occupies 80 ms of the overall cycle time T). So long as the interval between time $t_{thresh}$ and the start of the next subsequent slot to be monitored remains constant over all slot indices, for example, 1.00 seconds, then $t_{thresh} = t_{start} + 1.28 \times 2^i - 1.08$ seconds, wherein $t_{start}$ is the time at the start of the last monitored slot. Alternatively, the threshold time may divide the total slot cycle time into a ratio (e.g., cycle time before $t_{thresh}$/cycle time after $t_{thresh}$) that is constant over all slot cycle index values. The threshold time may be set to always exceed a minimum value (e.g., the basic slot cycle time of 1.28 seconds), it may be a fixed value stored in mobile station memory 24, it may be calculated based on the broadcast slot cycle index value i, or it may be transmitted by the network 8 either as a fixed value or as a value dependent upon particular capabilities of the mobile station 10 (e.g., if the MS supports maximum i=3, use $t_{thresh}=x$, if the MS supports maximum i=2, use $t_{thresh}=y$).

Figure 4:
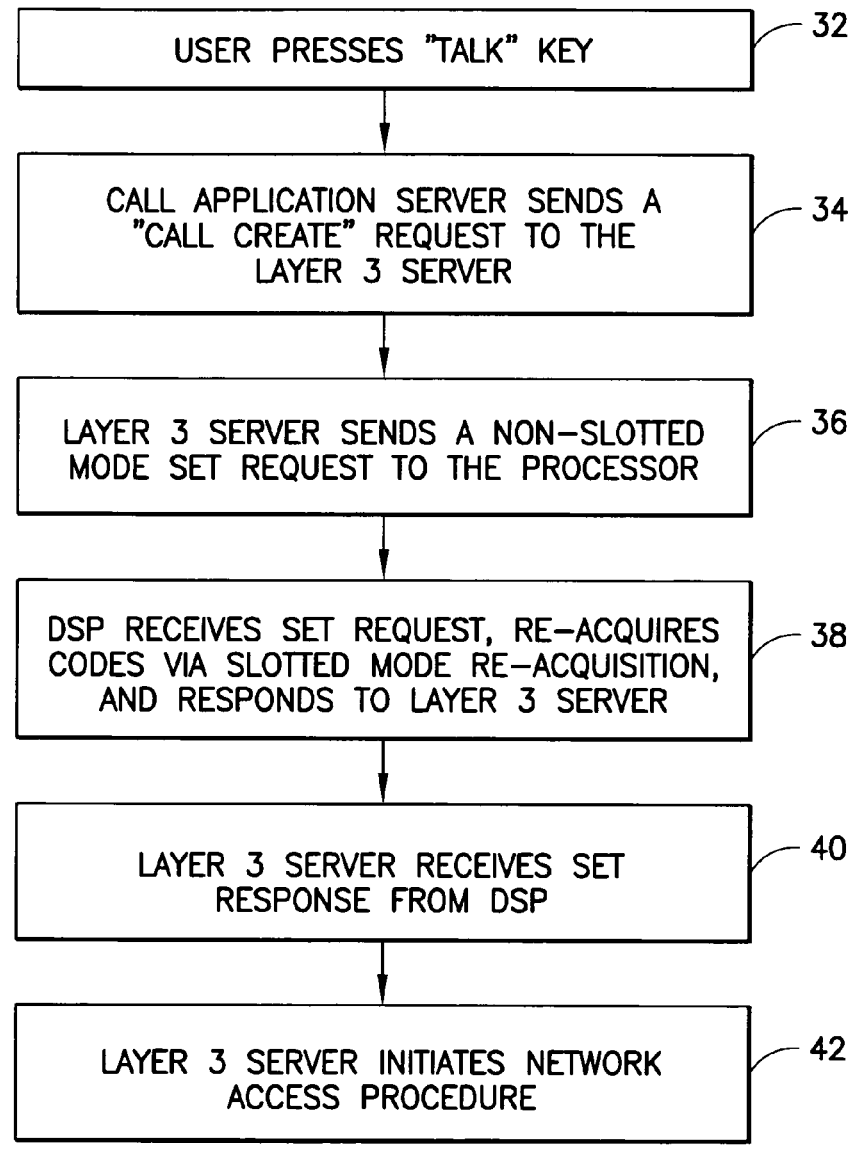
FIG. 4 is a block diagram depicting call access procedures tied to slot time.

In accordance with the prior art method of FIG. 4, when a user makes an input (box 32) at the user interface 26 to originate a call from the mobile station 10 (e.g., pressing the TALK button, speaking an appropriate command to a mobile station with voice recognition capabilities, etc.), the call application server 28 sends a CALL_CREATE message to the Layer 3 server 30 (box 34). The Layer 3 server 30 then sends a set request to the DSP 22 (box 36). This set request is not tied to the slot times of the paging channel, but merely a request for the short and long codes that are valid for the current time. The DSP 22 receives the set request and responds to the Layer 3 server 30 (box 38).

Due to other considerations in the architecture of prior art mobile stations, the DSP 22 typically does not re-acquire the codes immediately upon receiving the set request, but awaits the next slot that the mobile station 10 is required to monitor. This is termed slotted mode code re-acquisition, and it simplifies the calculations in re-acquiring the codes, thereby reducing demand on the battery of the mobile station 10. The last time that the mobile station 10 was awake, it knew the short and long codes and it also knew how long it would sleep until waking again to check the paging channel. Based on the codes and the anticipated sleep time, the mobile station 10 predicts the short and long codes for the time it is to wake up. The mobile station wakes according to a sleep timer, that is not as precise as the timer used to calculate the long and short codes. When the mobile station does wake according to the time on the sleep timer, the mobile station executes a 'window' search for the short and long codes rather than a search of the full PN (pseudorandom noise generator) space. Where a search of the full PN space encompasses searching 32,768 chips and may take as much as one second with the latest technology, searching the window may encompass, for example, only about 100 chips and take 10 milliseconds. The mobile station 10 very likely finds the codes via the window search, and bases its future predictions of the long and short codes (for the next time it sleeps) on exactly where in the window the codes were found this time (due to inaccuracies in the sleep timer or other reasons).

A search using slotted mode code re-acquisition consumes substantially less battery power than a of the full PN space, especially when multiplied over every slot. As detailed above, a slot cycle index i=2 enables a lag time of up to about 5 seconds. The majority of this lag time is consumed by awaiting the start of the next subsequent slot to minimize battery consumption as above. The Layer 3 server 30 eventually receives the set response from the processor 22 (box 40) and initiates access procedures (box 42), which culminate in transmitting an access request to the base station 12 over a reverse or uplink access request channel. Because the long code uniquely identifies the mobile station 10, the access request typically must include the long code.

FIG. 5 is a flow diagram depicting the decision process of the preferred embodiment of the present invention. The user presses the TALK key and the call application server 28 sends a CALL_CREATE request to the Layer 3 server as described with reference to FIG. 4. Upon receipt of the CALL_CREATE request, the Layer 3 server compares the current time $t_{curr}$ at the timer 20 to a threshold time $t_{thresh}$ (box 44). Preferably, the threshold time is stored in memory 24, or a calculation to compute the threshold time based in the index value is stored in memory 24. If the current time is later in the slot cycle than the threshold time (e.g., point A of FIG. 3B, box 46 of FIG. 5), the Layer 3 server sends a set request to the DSP 22, and the DSP 22 re-acquires those codes as described above with reference to FIG. 4. If instead the current time is earlier in the slot cycle than the threshold time (e.g., points B or C of FIG. 3B, box 48 of FIG. 5), the LAYER 3 server instead directs the DSP to perform pilot acquisition to re-acquire the short and the long codes (box 50).

Pilot re-acquisition is a method to re-acquire the short and long codes regardless of slot time. Pilot acquisition requires no previous knowledge of the short or long codes, or of the slot time or sleep time for the mobile station 10. It is a calculation and power intensive method whereby the mobile station 10 directs its fingers to search the entire PN space of 32,768 chips to find the strongest energy and the corresponding PN position. The mobile station 10 then assigns and locks its fingers into that PN position. The mobile station then decodes the synchronization (Synch) channel, and uses that channel to adjust system time, and then gets into the paging channel at the precisely aligned slot. The DSP 22 re-acquires codes for the current time using pilot acquisition at box 52 and sends them to the Layer 3 server. Further actions are in accordance with box 40 and 42 of FIG. 4, as previously described. Though the calculations for re-acquiring the codes via pilot acquisition more onerous than doing so using the slotted mode technique, there is a net savings in power consumption whenever the slot cycle index i is greater than a set value. This is true because the power savings occur over every slot so long as i>0, whereas the relative greater power consumption (as compared to the fixed interval approach) occurs only when a call is initiated at a time in a slot that is earlier than the threshold time.

While described in the context of presently preferred embodiments, those skilled in the art should appreciate that various modifications of and alterations to the foregoing embodiments can be made, and that all such modifications and alterations remain within the scope of this invention. For example, it is hereby stipulated that any time-based parameter that may itself be used to calculate either or both of the threshold time and the current time are inconsequential modifications of the ensuing claims that reference threshold and/or current time, and shall not avoid such claims for that reason alone. Examples herein are stipulated as illustrative and not exhaustive.

What is claimed is:

1. A method of requesting access from a mobile station to a network by which to conduct user-to-user communications, comprising:
    receiving a user input at a first time;
    comparing the first time to a threshold time;
    calculating a time-dependent code according to a first method if the first time is earlier than the threshold time, and according to a second method if the first time is later than the threshold time;
    transmitting the access request to the network.

2. The method of claim 1 wherein the threshold time is based on a designated slot time.

3. The method of claim 1 wherein the first method includes re-acquiring the time-dependent code independent of a designated slot time.

4. The method of claim 1 wherein the second method includes re-acquiring the time-dependent code for a time that defines at least a portion of a designated slot.

5. The method of claim 1 wherein the threshold time falls between an end of a previous slot and the beginning of a next subsequent slot, and wherein the slots are time periods that the mobile station is to monitor a paging channel.

6. The method of claim 5 wherein an interval between the threshold time and the start of the next subsequent slot is fixed regardless of the value of a slot cycle index.

7. The method of claim 1 wherein the time-dependent code comprises a CDMA long code.

8. A mobile station comprising:
    a user interface for receiving a user input at a first time;
    circuitry for comparing a threshold time to the first time, wherein the threshold time is related to a slot time;
    a processor for calculating a time-dependent code according to a first solution if the first time is earlier than the threshold time, and according to a second solution if the first time is later than the threshold time; and
    a PN code generator coupled to the processor for generating the time dependent code according to the first or second solutions.

9. The mobile station of claim 8 wherein the first solution is independent of the slot time.

10. The mobile station of claim 8 wherein the second solution is dependent upon the slot time.

11. The mobile station of claim 8 wherein the threshold time falls between an end of a previous slot and the beginning of a next subsequent slot, and wherein the slots are time periods that the mobile station is to monitor a paging channel.

12. The mobile station of claim 11 wherein an interval between the threshold time and the start of the next subsequent slot is fixed regardless of the value of a slot cycle index.

13. The mobile station of claim 8 wherein the time-dependent code is a CDMA long code.

14. A method for determining how a mobile station operating within a slot of a slotted mode acquires a time-dependent code, comprising:
    determining a threshold time $t_{thresh}$ based on a slot cycle index;
    receiving an input at a user interface of the mobile station at a current time $t_{curr}$;
    comparing $t_{curr}$ to $t_{thresh}$;
    performing pilot acquisition of the time-dependent code if $t_{curr}$ is earlier in a slot than $t_{thresh}$.

15. The method of claim 14 wherein the mobile station determines the threshold time.

16. The method of claim 15 wherein the mobile station calculates the threshold time based on a slot cycle index value transmitted by a network.

17. The method of claim 14 wherein the threshold time is broadcast by a network.

18. The method of claim 14 wherein a formula for determining the threshold time based on the slot cycle index is broadcast by a network.

* * * * *